March 22, 1960 A. VAN DUYN 2,929,423
ADJUSTABLE INCLINED GUIDE FOR SLICING MACHINE CARRIERS
Filed Sept. 10, 1956

INVENTOR:
ADRIANUS VAN DUYN
BY
Margall, Johnston, Cook + Root
ATT'YS

United States Patent Office 2,929,423
Patented Mar. 22, 1960

2,929,423

ADJUSTABLE INCLINED GUIDE FOR SLICING MACHINE CARRIERS

Adrianus van Duyn, Hillegersberg, Rotterdam, Netherlands, assignor to U.S. Slicing Machine Company, Inc., La Porte, Ind., a corporation of Indiana Application September 10, 1956, Serial No. 608,732

Claims priority, application Great Britain September 21, 1955

1 Claim. (Cl. 146—102)

This invention relates to apparatus for slicing meats or other edible foods at an obliquity to the slicing plane of the slicing knife so that the width of the slices will be greater than the width of the food.

In food slicing machines, it is necessary, after using a machine, to be able to easily clean the machine for subsequent usage. For this purpose, it is also necessary that certain parts of the machine be easily removed for cleaning hard-to-get surfaces.

Accordingly, it is an object of this invention to provide an apparatus for slicing meats and other edible foods at an obliquity that is constructed in such a manner wherein certain parts may be easily removed for cleaning thereof.

Another object of this invention is in the provision of a slicing machine capable of supporting meat or other edible foods to be sliced at an obliquity to the slicing plane of the knife so that the width of the slices will be greater than the width of the food.

Still another object of this invention resides in the provision of a slicing machine having food carriage reciprocable along an axis parallel to the slicing plane of a knife and an upstanding lateral food support adjustable for positioning the food to be sliced at any desired angle with respect to the slicing plane.

A further object of this invention is to provide a slicing machine having food carriage reciprocable along an axis parallel to the slicing plane of a knife and an upstanding lateral food support angularly adjustable relative to the slicing plane and easily removable from the machine for cleaning purposes.

A still further object of this invention is in the provision of a slicing machine having a lateral food support which is angularly adjustable to the slicing plane, wherein the lateral food support is mounted so that during angular adjustment it is maintained in substantially uniform closeness to the slicing plane.

Other objects, features, and advantages of the invention will be apparent from the following detailed disclosure, taken in conjunction with the accompanying sheet of drawings, wherein like reference numerals refer to like parts, in which.

Figure 1:
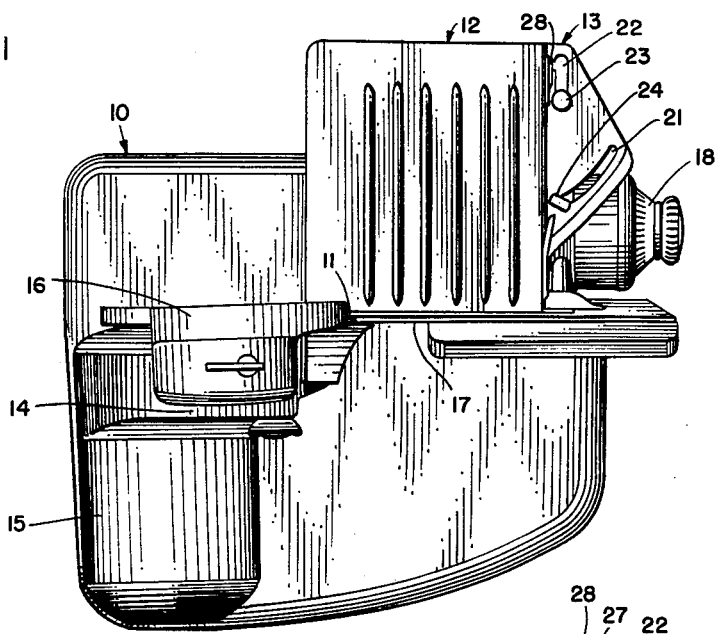
Fig. 1 is a top plan view of a slicing machine according to the invention.

Referring to the drawings, the slicing machine of this invention includes generally a base or frame 10, a power driven slicing knife 11, a carriage 12 adapted to receive the food to be sliced, and an upstanding lateral food support 13.

The knife 11 in this instance is circular and rotatably mounted on a shaft journaled in a bracket 14 which is suitably mounted on the base 10. The knife 11 is powered by a motor 15 secured on the base 10 and in driving relationship to the shaft journaling the knife 11. It will be understood that a suitable gearing arrangement may be provided between the motor and the shaft in order to obtain the proper driving ratio between the motor and the knife. In order to prevent inadvertent accidents with respect to the knife 11, a conventional removable guard 16 is secured to the bracket 14 in associated relationship with the knife 11.

For varying the slice thickness of the food, an upstanding gauge plate 17 is adjustably mounted on the base 10 in parallel relationship to the slicing plane of the knife 11, and being reciprocable along an axis normal to the slicing plane. Adjustment of this gauge plate is accomplished by means of a control knob 18, and suitable mechanism (not shown).

The food to be sliced is primarily supported on the horizontally extending carriage 12 which reciprocates along an axis parallel to the slicing plane of the knife 11. Movement of the carriage 12 may be effected by hand or suitable mechanism interconnected with the motor 15. It will be understood that the carriage 12 is capable of conveying the meat or food to be sliced beyond the cutting edge of the slicing knife 11.

Figure 2:
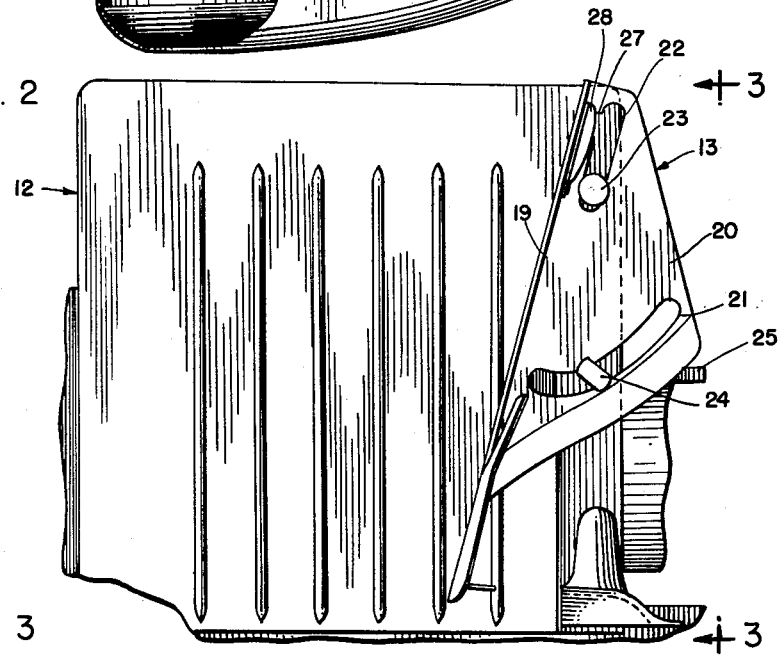
Fig. 2 is an enlarged fragmentary view of the main food support and the lateral food support, illustrating the adjustability and removability features of the lateral food support in accordance with the invention.
Figure 3:
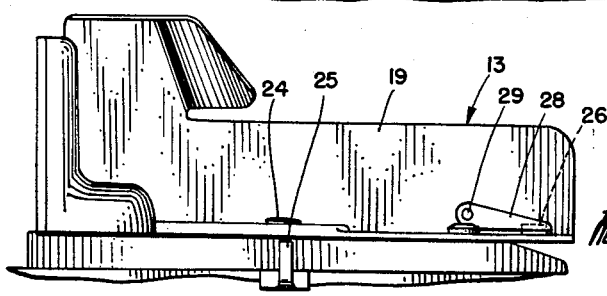
Fig. 3 is an end elevational view of the lateral food support taken substantially along line 3—3 of Fig. 2.

Referring more particularly now to Figs. 2 and 3, it is seen that the lateral food support 13 includes a vertically upstanding food engaging plate 19 extending upwardly from the top surface of the carriage 12 and a horizontal supporting flange 20 integral with the bottom edge of the vertical plate 19 and generally resting on the carriage 12. The support flange 20 further serves to connect the vertical plate 19 to the carriage 12 and is provided with an arcuate slot 21 and a straight slot 22. The straight slot 22 engages a pin 23 fixedly mounted on the carriage 12 and having an enlarged circular head sized to have a diameter greater than the width of the slot 22. Thus, the lateral food support 13 may pivot around the pin 23 and slide along the carriage 12 within the limitation of the slot 22.

In order to further constrain the movement and adjustability of the lateral food support 13, a pin 24 engages the arcuate slot 21, and is provided with a substantially rectangularly shaped head. The head of the pin 24 has a length greater and a width slightly smaller than the width of the slot 21. Further, the pin 24 is movable up and down with respect to the carriage 12, but is keyed thereto so as to prevent relative rotation therewith. While not shown, the bottom end of the pin 24 is threaded to receive a nut having a handle or lever 25 rigidly secured thereto which functions as a wrench for loosening or tightening the pin 24 relative to the lateral food support flange 20 and the carriage 12.

In Fig. 1, the lateral food support 13 is positioned at right angles to the slicing plane of the knife 11 so that normal slices will be cut. In this respect, the food to be sliced, such as a loaf of meat, would be positioned on the top surface of the carriage 12, against the vertical plate 19 of the lateral food support 13 on one side, and against the gauge plate 17 at one end. For oblique slicing, the handle 25 would be manipulated to loosen the pin 24 and allow adjustment of the lateral food support 13 to any position desired, such as that shown in Fig. 2, wherein the vertical food engaging plate 19 will then be angularly related on the oblique relative to the slicing plane of the knife 11. Manipulation of the handle 25 will then effect a tightening of the pin 24 for temporarily positioning the lateral food support in its new position. During the pivotal movement of the lateral food support 13, the slots 21 and 22 coact with the pins 24 and 23, respectively, to guide the vertical food engaging plate 19 along a path having a component which is pivotal about the pin 23 and a component which is arcuate about the pin 24 in the direction of the slicing plane. In other words, the edge of the vertical plate 19 which is closest to the gauge plate 17 moves substantially parallel to the slicing plane so that the food to be sliced is effectively supported close to the slicing knife 11 during all settings of the lateral food support 13.

Referring again to Figs. 2 and 3 and the lateral food support 13, an opening 26 is formed in the rear section of the vertical plate 19 which communicates with the slot 22 by means of a slot 27 extending transverse to the longitudinal axis of the slot 22. The opening 26 and the slot 27 are sized to be slightly larger than the head of the pin 23 so that the head of this pin may pass easily through the opening for removal of the lateral food support 13 from the carriage 12. In order to normally block passage of the pin 23 through the opening 26 and the slot 27, a movable arm 28 is pivotally mounted at 29 so that it may extend over the opening 26 in its down position. When it is desired to remove the lateral food support 13 from the carriage 12 for cleaning purposes, the lever 25 will be manipulated to loosen the pin 24 so that the flange 20 is free to move, and the entire lateral food support 13 is turned clockwise until the pin 23 is aligned with the slot 27. The arm is then lifted to permit the head of a pin 23 to pass through the opening 26, at which time the entire lateral food support is again turned clockwise to free the flange 20 from the head of the pin 23. The lateral food support 13 is then turned clockwise until the flat sides of the head of the pin 24 reaches substantial parallelism with the slot 21, at which time the entire lateral food support 13 may be lifted upwardly and removed from the machine. In order to reassemble the lateral food support 13 on the carriage 12, the operator simply reverses the foregoing sequence of steps.

From the foregoing, it is seen that a slicing machine is provided which is capable of slicing foods at an obliquity by means of an adjustable lateral food support, and which is constructed so that the lateral food support may be easily removed for cleaning purposes without requiring any special tools.

It will be understood that modifications and variations may be effected without departing from the scope of the novel concepts of the present invention, but it is understood that this application is to be limited only by the scope of the appended claims.

The invention is claimed as follows:

An apparatus for slicing solid foods or the like which comprises a base, a power driven slicing knife mounted on said base, a horizontally extending carriage for receiving said food and being reciprocably mounted on said base along an axis parallel to the slicing plane of said knife, a gauge plate extending normal to said carriage and parallel to the slicing plane of said knife and adjustable to regulate the slice thickness, and a lateral food support including a support portion and a food engaging portion, said food engaging portion extending along the vertical above said carriage, said support portion being connected to the bottom edge of said food engaging portion and engaging the upper surface of said carriage, an arcuate slot in said support portion, a clamping member including a shank received by said carriage and extending through said arcuate slot, a head on one end of said shank overlying said support portion, said head being longer in one dimension than the width of the arcuate slot and narrower in the other direction than the width of said arcuate slot, and manipulatable means on the other end of said shank for selectively urging said head against said support portion to hold the latter in frictional engagement with said carriage, a straight slot in said support portion spaced from said arcuate slot, a pivot pin carried by said carriage having a head larger than the width of said straight slot and overlying said support portion, an opening extending from said straight slot larger than said head, and means for selectively opening said opening, whereby said lateral food support may be removed from said carriage.

References Cited in the file of this patent
UNITED STATES PATENTS

| | | |
|---|---|---|
| 812,574 | Linton | Feb. 13, 1906 |
| 1,947,896 | Campbell | Feb. 20, 1934 |
| 2,598,739 | Zimmermann | June 3, 1952 |

FOREIGN PATENTS

| | | |
|---|---|---|
| 627,871 | Germany | July 24, 1936 |